United States Patent

[11] 3,617,446

[72] Inventors Kiyoshi Nakayama
 Sagamihara-shi;
 Haruo Tanaka, Machida-shi, Tokyo, both of Japan
[21] Appl. No. 762,994
[22] Filed Sept. 26, 1968
[45] Patented Nov. 2, 1971
[73] Assignee Kyowa Hakko Kogyo Kabushiki Kaisha Tokyo, Japan
[32] Priority Sept. 27, 1967
[33] Japan
[31] 42/61678

[54] PREPARATION OF 6-AZAURIDINE
3 Claims, No Drawings
[52] U.S. Cl. ........................................................ 195/28
[51] Int. Cl. ................................................. C12d 13/06

[50] Field of Search ............................................ 195/28 N

[56] References Cited
UNITED STATES PATENTS
3,168,446  2/1965  Omura et al. ..................  195/28 N
3,298,923  1/1967  Banno et al. ..................  195/28 N OTHER REFERENCES
Davidson et al., Progress In Nucleic Acid Research, Vol. 2, pp. 202– 206 (1963)
Kohn et al., J. Bacteriology, Vol. 86, No. 4, pp. 713– 716 (1963)

Primary Examiner— Alvin E. Tanenholtz
Attorney— Meyer A. Gross

ABSTRACT: The present invention relates to a process for preparing 6-azauridine by the dephosphorilation of 6-azauridylic acid by means of micro-organisms.

PREPARATION OF 6-AZAURIDINE

BACKGROUND OF INVENTION

It is known to prepare 6-azauridine by way of chemical synthesis (e.g., U.S. Pat. No. 3,135,737) or by way of biological preparation from 6-azauracil [Collection Czechoslovak Chemical Communication 22, 1330(1957); Biochem, Biophys. Acta 23, 428 (1957)]. But the known processes have considerable disadvantages, such as low yield and high costs.

A process has recently been discovered for preparing biologically a highly concentrated 6-azauridylic acid [1,2,4-triazine-3,5-(2H, 4H) dione-2$\beta$-D-riboflanoside-5'-pyrophosphate], in a high yield from 6-azauracil. This process is disclosed and claimed in our pending U.S. Pat. application No. 671,561 (which is incorporated by reference into the present application). It is possible to obtain 6-azauridylic acid economically and on large scale by the process of said copending application No. 671,561. The aforesaid 6-azauridylic acid can with advantage be used for the purpose of the present invention.

An object of the present invention is to provide a process for preparing 6-azauridine, which is useful, for example, as anticancer agent [R.E. Handchumacher et al.: Cancer Chemotherapy Reports, No. 21, 1–18 (1962)] and as antiviral agent [V. Myska et al.: Lancent, 1230–1231 (June 3, 1967)].

As a result of studies in the dephosphorylation of 6-azauridylic acid, we have found that 6-azauridine can with advantage be obtained by contacting 6-azauridylic acid with various micro-organisms in an aqueous medium. The concept of using micro-organisms to produce 6-azauridine from 6-azauridylic acid is as heretofore unknown in the art.

It is indeed well known that certain micro-organisms are capable of dephosphrylating ordinary purine- and pyrimidinenucleotides so as to form nucleosides and that certain phosphates and nucleotidase are capable of catalyzing this reaction, but the fact that a micro-organism is capable of dephosphorylating 6-azauridylic acid from 6-azauridine was heretofore unknown.

The process of the present invention involves the use of micro-organism capable of forming 6-azauridine by the dephosphorylation of 6-azauridylic acid. Various micro-organisms may be used for the purpose of the present invention as far as they are capable of forming 6-azauridine by the dephosphorylation of 6-azauridylic acid. But it is preferred to use for example micro-organisms belonging to Enterobacteriaceae, Micrococcaceae Bacillaceae, Brevibaceriaceae, Corynebactriaceae, Streptomycetaceae, Candida, Penicillium, Rhizopus, Mucor etc.

According to the present invention, 6-azauridylic acid, which is contained in an aqueous medium, is placed in contact with a micro-organism capable of converting 6-azauridylic acid into 6-azauridine. The present invention also includes the use of grown microbial cell capable of acting enzymatically to convert the acid into 6-azauridine even when the microbe has died out as long as the enzymatic activity remains.

An aqueous solution containing only 6-azauridylic acid can indeed be used as the aqueous medium of the present invention. But it is preferred to use in aqueous medium which also contains other nutrients required conventionally for the growth of micro-organisms to be used.

Other nutrients of conventional types which may be used for the purpose of the present invention include for example carbon sources such as glucose; galactose etc., nitrogen sources such as ammonium sulfate; urea; ammonium chloride etc., inorganic salts such as potassium phosphate; magnesium sulfate etc., etc. It is also possible to use various growth-promoting substances such as, e.g., vitamins (biotin, thiamine etc.), amino acids (aspartic acid, glutamic acid etc.) etc.

It is also possible to use a fermentation liquor containing a biologically prepared 6-azauridylic acid. The fermented broths or fermentation liquor containing 6-azauridylic acid prepared biologically are those described in our copending U.S. Pat. application No. 671,561 (incorporated by reference). In such process, a micro-organism belonging to the genus Brevibacterium, Corynebacterium, Arthrobacter or Micrococcus is cultivated under aerobic conditions in an aqueous nutrient medium containing 6-azauracil or 6-azauridine as an additive substance to produce 6-azauracil ribotide in the medium.

6-azauridylic acid can be used in its free form, while 6-azauridylic acid salts such as, e.g., sodium salt, ammonium salt can also be used with good results. The pH of the medium is preferably adjusted to about 1.0 to 10. especially 4.0 to 9.0, and the cultivation is generally carried out at 10° to 90° C., preferably at about 20° to 40° C.

The culture time depends upon various factors such as an amount of microbial cells added to the aqueous medium containing 6-azauridylic acid, activity of the micro-organisms used etc. Generally in the enzymatic treatment and fermentation treatment, it takes about 1 to 24 hours, and 1 to 7 days, respectively. But it is preferred to continue the cultivation until a sufficient amount of 6-azauridine can be accumulated in the medium. All of the micro-organisms set forth by ATCC number were on unrestricted deposit and freely available to the public at the time of filing of the priority application on Sept. 27, 1967, with the following exceptions, which were freely available on the dates indicated as follows:

Mucor alternans ATCC 20132 and July 24, 1968
Rhizopus acetorinus ATCC 20133 July 24, 1968

The following nonlimitative examples illustrate the invention. The amount of 6-azauridine produced in the examples was obtained in a conventional manner by subjecting a predetermined amount of the sample to paper chromatography to obtain UV-absorption values indicating the amount of 6-azauridine produced.

EXAMPLES 1 TO 11

A loopful amount of each of the micro-organisms shown in the following table 1 were respectively cultured by means of respective aqueous medium, each containing glucose (2 percent), yeast extract (1 percent), peptone (1 percent) and sodium chloride (0.25 percent), for 24 hours. Each fermented broth was treated in the following manner:

10 ml. of the broth was added to 10 ml. of fermented broth (pH: 6.6) containing 6-azauridylic acid (concentration: 12.0 mM) in a big test tube. The shaking of the culture was carried out at 30° C. for 6 hours. The amounts of 6-azauridine produced are shown in table 1 as the molar concentration in the 6-azauridylic acid-containing broth used.

In examples, the 6-azauridylic acid-containing broth was produced in the following manner:

Brevibacterium ammoniagenes ATCC 6872 was used as the seed bacterium. It was cultured at 30° C. for 24 hours in a culture medium having a composition consisting of glucose (2 percent), peptone (1 percent), yeast extract (1 percent), NaCl (0.3 percent) and biotin (30 $\mu$ g./l.). The resultant seed culture was transplanted in an amount of 10 percent by volume to a fermentation culture medium having the following composition:

| TI glucose | 100 g. | urea | 6 g. |
|---|---|---|---|
| KH$_4$PO$_4$ | 10 g. | K$_2$HPO$_4$ | 10 g. |
| MgSO$_4$·7H$_2$O | 10 g. | CaCl$_2$·2H$_2$O | 0.1 g. |
| biotin | 30 $\mu$g. | yeast extract | 10 g. |

This fermentation medium was made up by dissolving the above components in water and diluting to one liter, adjusting the pH thereof to 8.0 with NaOH and sterilizing in an autoclave at one kg./cm.² for 10 minutes. The medium was then poured into individual flasks having a capacity of 250 ml., 20 ml. to each. After transplanting, the seed culture as described above fermentation was then carried out with aerobic shaking of the culture at 30° c. After cultured for 72 hours, 6-azauracil was added to the culture solution in an amount such that its concentration in the fermented broth become 2 mg./ml. Culturing was continued for a further 24 hours, during which time 6-azauracil ribotide was produced and accumulated in the culture liquor.

In table 1, the concentration of 6-azauridine shown there is twice as much as that in fact determined for the purpose of contrasting clearly the produced amount of 6-azauridine with that of the initial 6-azauridylic acid. Advantageous results obtained by the process of the present invention are apparent from this table.

The fermented liquor, such as 100 ml. of *Escherchia coli*, ATCC 9723, thus prepared was filtered to remove microbial cells and was treated with active charcoal (5 g.) to adsorb 6-azauridine thereon. The adsorbed 6-azauridine was eluted with 50 percent ethanol (50 ml.) containing 2 percent $NH_4OH$. The eluate was concentrated in vacuo, was adjusted to a pH of 8.5 and was then passed through a styrene type basic anion exchange resin Dowex 1 × 4 (formic acid form: 200-400 meshes) so as to adsorb 6-azauridine. After eluting with 0.1 N formic acid, 6-azauridine fractions were combined and concentrated to dryness. The crude product obtained was crystallized by means of water and ethanol to yield purified 6-azauridine (70 mg.; purity - almost 100 percent). The above procedure was employed with each of the samples shown in table 1.

TABLE I

| | Amounts of 6-azauridine produced (mM.) | |
|---|---|---|
| | Treatment time (hours) | |
| Microorganisms used | 6 | 12 |
| Ex.: | | |
| 1.... *Escherchia coli* (ATCC 10798) [1] | 3.47 | 5.21 |
| 2.... *Escherchia coli* (ATCC 9637) [1] | 4.93 | 5.84 |
| 3.... *Escherchia coli* (ATCC 9723) [1] | | 10.82 |
| 4.... *Micrococcus sodonensis* (ATCC 11880) [1] | 3.06 | 4.24 |
| 5.... *Aerobacter aerogenes* (ATCC 8308) [1] | 4.52 | 3.89 |
| 6.... *Arthrobacter simplex* (ATCC 15799) [1] | | 5.07 |
| 7.... *Arthrobacter ureafaciens* (ATCC 7562) [1] | | 2.54 |
| 8.... *Mucor alternans* (ATCC 20132) [2] | | 8.92 |
| 9.... *Rhizopus acetorinus* (ATCC 20133) [2] | 2.85 | 10.82 |
| 10... *Penicillium chrysogenum* (ATCC 15241) [2] | | 3.97 |
| 11... *Streptomyces coelicolor* (ATCC 3355) [3] | | 2.15 |

Remarks.—[1] Bacteria; [2] Fungi; [3] Streptomyces.

EXAMPLES 12 TO 19

A loopful amount of each of the micro-organisms shown in table 2 were respectively treated in the following manner:

The cultivation was carried out in a medium containing glucose (2 percent), peptone (1 percent), yeast extract (1 percent) and sodium chloride (0.25 percent) for 24 hours at 30° C. to obtain fermentation broths. One ml. of the broths was added to 10 ml. of fermented broths (pH-6.6) prepared as described in example 1, containing 6-azauridylic acid (concentration 12.0 mM), which was cultured at 30° C. for 6 hours. A similar cultivation was continued additionally for 24 hours in total. The amounts of 6-azauridine produced by means of different micro-organisms are shown in table 2 as the molar concentration in the 6-azauridylic broth used. For the purpose of making it easy to compare the concentration of the obtained 6-azauridine with that of the initial 6-azauridylic acid, the value of the concentration of 6-azauridine is calculated on the basis of the initial 6-azauridylic broth.

TABLE 2

| Microorganisms used | Amounts of 6-azauridine produced (mM.), treatment time (hours) 24 |
|---|---|
| Ex.: | |
| 12.... *Escherchia coli* (ATCC 10798) [1] | 1.96 |
| 13.... *Micrococcus sodonensis* (ATCC 11880) [1] | 2.76 |
| 14.... *Bacillus megaterium* (ATCC 15177) [1] | 2.15 |
| 15.... *Aerobacter aerogenes* (ATCC 8308) [1] | 9.12 |
| 16.... *Brevibacterium vitarumen* (ATCC 10234) [1] | 1.96 |
| 17.... *Arthrobacter ureafaciens* (ATCC 7562) [1] | 1.42 |
| 18.... *Canida utilis* (ATCC 16321) [2] | 0.08 |
| 19.... *Penicillium chrysogenum* (ATCC 15241) [3] | 2.38 |

Remarks.—[1] Bacteria; [2] Yeast; [3] Fungi.

EXAMPLE 20

40 ml. of an aqueous medium containing 2 percent glucose, 1 percent yeast extract and 0.25 percent sodium chloride was put in a 250 ml. conical flask and was inoculated with a loopful amount of Escherchia coli (ATCC 9723). The shaking culture was continued for 24 hours. From the fermented liquor were collected microbial cells of Escherchia coli by centrifugation.

50 ml. of the microbial cells thus obtained was added to a long tube (70 ml.) containing 5 ml. of an aqueous solution of 6-azauridylic acid (concentration: 1.2 mM). The mixture was shaken-cultured for 24 hours at 30° C. to yield 6-azauridine (concentration: 0.58 mM).

What is claimed is:

1. A process for preparing 6-azauridine, which comprises culturing 6-azauridylic acid with a micro-organism capable of converting 6-azauridylic acid into 6-azauridine belonging to the species selected from the group consisting of *Micrococcus sodonensis*, *Aerobacter aerogenes*, *Arthrobacter simplex*, *Arthrobacter ureafaciens*, *Mucor alternans*, *Rhizopus acetorinus*, *Bacillus megaterium*, *Brevibacterium vitarumen*, *Penicillium chrysogenum*, *Candida utilis* and *Streptomyces coelicolor* in an aqueous medium and recovering the accumulated 6-azauridine.

2. The process of claim 1 wherein the culturing is effected at a pH of 1 to 10 and at a temperature of 10° to 60° C.

3. The process of claim 1 wherein said medium contains sources of carbon, nitrogen and of inorganic salts.

* * * * *